United States Patent [19]

Niwa et al.

[11] Patent Number: 5,203,586
[45] Date of Patent: Apr. 20, 1993

[54] PAD FOR AIR BAG DEVICE

[75] Inventors: Minoru Niwa; Shinichi Goto; Kimio Muramatsu, all of Aichi, Japan

[73] Assignee: Toyoda Gosei Co., Ltd., Nishikasugai, Japan

[21] Appl. No.: 740,628

[22] Filed: Aug. 5, 1991

[30] Foreign Application Priority Data

Aug. 9, 1990 [JP] Japan .................................. 2-212483

[51] Int. Cl.$^5$ ............................................. B60R 21/04
[52] U.S. Cl. .................................... 280/728; 428/136; 280/751
[58] Field of Search ............... 280/728, 730, 731, 732, 280/743, 751; 425/249; 156/224, 252; 264/254; 428/136, 138

[56] References Cited

U.S. PATENT DOCUMENTS

| | | | |
|---|---|---|---|
| 2,800,423 | 7/1957 | de Swart | 428/136 |
| 3,297,461 | 1/1967 | Siddall | 428/136 |
| 4,262,059 | 4/1981 | Frankowski | 428/136 |
| 4,334,699 | 6/1982 | Patzelt et al. | |
| 4,852,907 | 8/1989 | Shiraki et al. | 280/731 |
| 5,069,477 | 12/1991 | Shiraki | 280/731 |

FOREIGN PATENT DOCUMENTS

| | | | |
|---|---|---|---|
| 3116538 | 11/1982 | Fed. Rep. of Germany | 280/732 |
| 63-182115 | 7/1988 | Japan . | |

Primary Examiner—Karin L. Tyson
Attorney, Agent, or Firm—Cushman, Darby & Cushman

[57] ABSTRACT

A pad for an air bag device including an upper wall portion which has an openable portion which, upon expansion of the air bag, is separated from a side wall portion of the pad, leaving a hinge portion, and is angularly movable about that pivot axis so as to be openable. The openable portion is constituted by a net insert of a net-like configuration and a covering layer of a soft material covering the net insert. The net insert has a slit which is formed in one edge portion thereof remote from the hinge portion and extends toward the hinge portion. With this construction, even if part of the pad is curved, the net insert can be set in a corresponding injection mold without generating wrinkles in the net insert, and the molding can be performed in such a manner that the openable portion has a good appearance.

5 Claims, 8 Drawing Sheets

PAD FOR AIR BAG DEVICE

BACKGROUND OF THE INVENTION

1. Field of the Invention

This invention relates to a pad for an air bag device for an automobile.

2. Description of the Prior Art

A conventional pad for an air bag device has an upper wall portion having openable portions which, upon expansion of an air bag, are separated from a side wall portion of the pad, leaving a hinge portion, and are angularly moved about the respective pivot axes so as to be opened.

The openable portions are composed of a net insert of a net-like structure and a covering layer of a soft synthetic resin material which covers the net insert (see Japanese Patent Unexamined Publication No. 63-182115).

As shown in FIG. 9, the net insert 1 has a base portion 2 which is embedded in the covering layer at the side wall portion of the pad, and upper portions 3 of rectangular shape extending from the base portion 2 and adapted to be embedded in the openable portions respectively. The opposite ends of the base portion 2 are connected together by sewing, so that the base portion 2 has a ring shape. Reference numeral 4 denotes a reinforcement cloth.

As shown in FIG. 10, when the covering layer is to be molded in an injection mold, the net insert 1 is set on a mold member 5 in such a manner that the base portion 2 is fitted on a predetermined portion of a mold member 5, with the meshes of the upper portions 3 engaged with set pins 6 fixedly mounted on the mold member 5. Then, the mold is closed, and the covering layer is molded.

As noted above, in the conventional pad for an air bag device, each upper portion 3 of the net insert 1 which is embedded in the openable portion of the pad is formed in a rectangular shape.

However, the upper wall portion of the pad is formed into a curved configuration. For that reason, the surface of the mold member 5 on which the set pins 6 are fixedly mounted is correspondingly curved. As a result, when the net insert 1 is set on the mold member 5 with the rectangular upper portions 3 engaged with the set pins 6, to mold the covering layer, wrinkles are liable to be produced in the upper portions 3.

When the covering layer is molded with the upper portions wrinkled, part of the upper portion 3 will be exposed, and a molding sink, a cavity, deformation or other defect will be produced in part of the covering layer. This adversely affects the appearance of the openable portion of the pad.

The foregoing phenomenon is not limited to the case where the upper wall portion of the pad is formed into a curved configuration, and can also occur when the side wall portion of the pad is formed into a curved configuration. Indeed, in that case wrinkles are also liable to be produced in the upper portions 3 of the net insert 1 when the net insert 1 is set on the mold member, thus adversely affecting the appearance of the openable portions of the pad.

SUMMARY OF THE INVENTION

To solve the above problems of the prior art, it is an object of this invention to provide a pad for an air bag device which has a net insert of a type which, even if part of the pad is formed into a curved configuration, can be set on an injection mold for molding the covering layer in such a manner that the portions of the net insert to be disposed in openable portions of the pad are not wrinkled, thereby ensuring the openable portion of the resultant pad will have a good appearance.

According to the present invention, a pad for an air bag device is provided wherein an upper wall portion of the pad has an openable portion which, upon expansion of an air bag, is separated from a side wall portion of the pad, leaving a hinge portion, and is angularly moved about that pivot axis so as to be opened; wherein the openable portion is composed of a net insert of a net-like structure and a covering layer of a soft material covering the net insert; and wherein each net insert in the openable portion has a slit which is formed in one edge portion thereof remote from the pivot axis and extends toward the pivot axis.

In the air bag pad of the present invention having a curved portion. When the net insert is set on the injection mold to form an air bag pad having a curved portion, the slit in the net insert is suitabley opened and closed so as to absorb any slack or loosening which would tend to produce wrinkles, so that the net insert can be set on the mold without generating any wrinkle in that portion of the net insert.

As a result, the covering layer can be molded in such a manner that none of the net insert will be exposed from the openable portion, and that no molding sink, cavity, deformation or other defect will be produced in the covering layer at the openable portion, thereby providing a good appearance of the openable portion of the pad.

Therefore, in the air bag pad of the present invention, even if part of the pad is formed into a curved configuration, the net insert can be set on the injection mold to mold the covering layer, without producing wrinkles in that portion of the net insert thereby ensuring a good appearance of the openable portion.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PREFERRED EMBODIMENTS

One preferred embodiment of the present invention will now be described with reference to the drawings.

Figure 1:
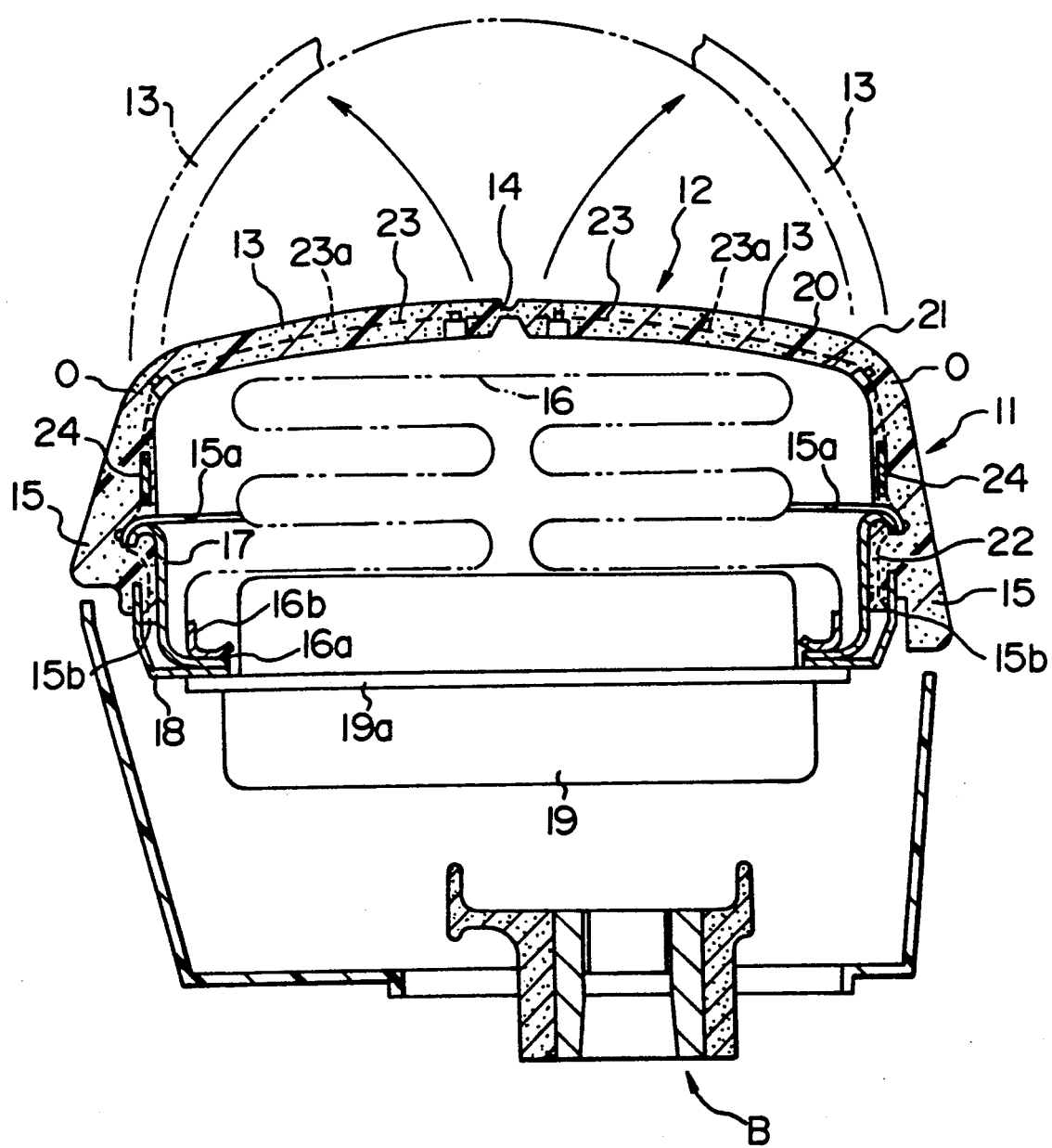
FIG. 1 is a cross-sectional view of one preferred embodiment of a pad of the present invention, showing the manner in which the pad is used.
Figure 2:
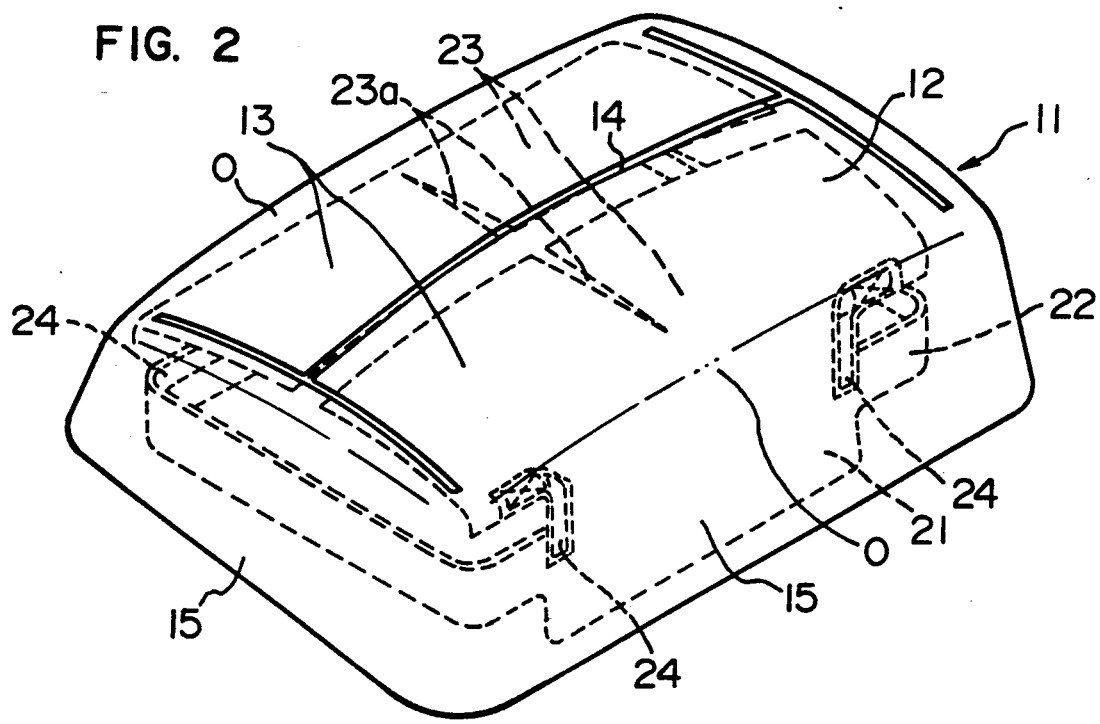
FIG. 2 is a perspective view of the pad.

As shown in FIGS. 1 and 2, a pad 11 for an air bag device is mounted on an upper portion of a boss B of a steering wheel of an automobile. The pad 11 is of a generally box-like shape, and has an upper wall potion 12 of a generally rectangular shape which is curved slightly convexly upwardly, and a side or peripheral wall portion 15 extending downwardly from the peripheral edge of the upper wall portion 12.

The upper wall portion 12 has a thinned potion 14 of a generally H-shape which allows the upper wall portion 12 to be easily broken upon expansion of an air bag 16. The upper wall portion 12 has a pair of openable portions 13, and the thinned portion 14 delimits each of the openable portions 13 at three sides thereof. Upon expansion of the air bag 16, each openable portion 13 is angularly moved about a pivot axis 0 so as to be opened.

The pad 11 includes a net insert 21 embedded in a covering layer 20. The net insert 21 has a ring-like base portion 22 provided in the side wall portion 15, and a pair of upper portions 23, each of which extend upwardly from the base portion 22 and are provided respectively in the pair of openable portions 13.

Figure 3:
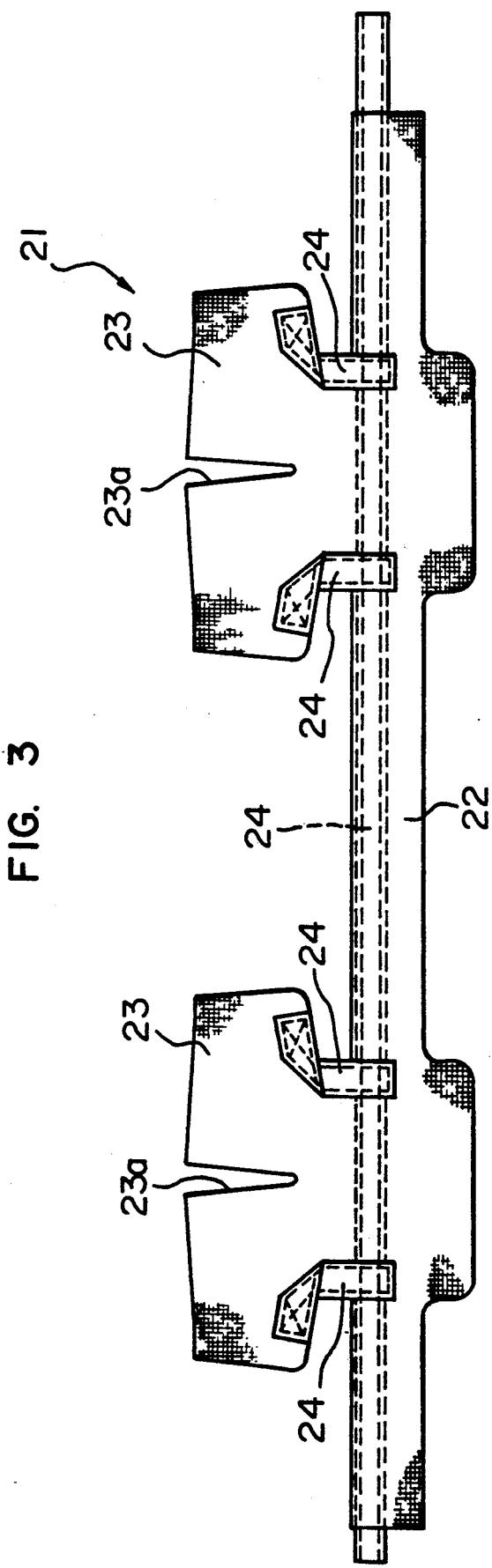
FIG. 3 is a developed view of a net insert used in the pad.

The covering layer 20 is made of a soft synthetic resin such as urethane. The net insert 21 is formed by weaving fibers of a synthetic resin such as polyamide, and has reinforcement cloths 24 of aramid fibers sewn to predetermined portions thereof (see FIG. 3).

Each of the upper portions 23 of the net insert 21 has a slit 23a which is formed in a central portion of one edge of the upper portion 23 remote from the hinge portion or pivot axis 0 and extends toward the pivot axis 0.

In the event of an emergency, the air bag 16 is expanded or inflated by gas generated from an inflator 19. The air bag 16 is normally folded and received in the pad 11. A ring-like retainer 16b is provided at an inner peripheral surface of a lower open portion 16a of the air bag 16 adjacent to the lower edge of the lower open portion 16a. The air bag 16 is attached to a back-up plate 17 by securing the retainer 16b to the back-up plate 17, a holder 18 and a flange 19a of the inflator 19 by bolts or the like.

A retaining groove 15a of arcuate cross-section is formed in the inner peripheral surface of the lower portion of the side wall portion 15 of the pad 11. Also, a vertically-extending retaining groove 15b is formed in the lower end face of the side wall portion 15. The upper portion of the back-up plate 17 fits in the retaining groove 15a, and the upper portion of the holder 18 fits in the retaining groove 15b. The lower portion of the side wall portion 15 is held between the back-up plate 17 and the holder 18, thereby securing the pad 11 to the back-up plate 17.

When the air bag 16 is expanded, the back-up plate 17 causes this pressure to act upwardly. In this embodiment, the back-up plate 17 is connected to a core metal member of the steering wheel via a horn switch mechanism, and the air bag device comprising the pad 11, the air bag 16, the inflator 19 and etc., is mounted on the upper portion of the boss B.

Next, a method of molding the covering layer 20 of the pad 11 will be described.

Figure 4:
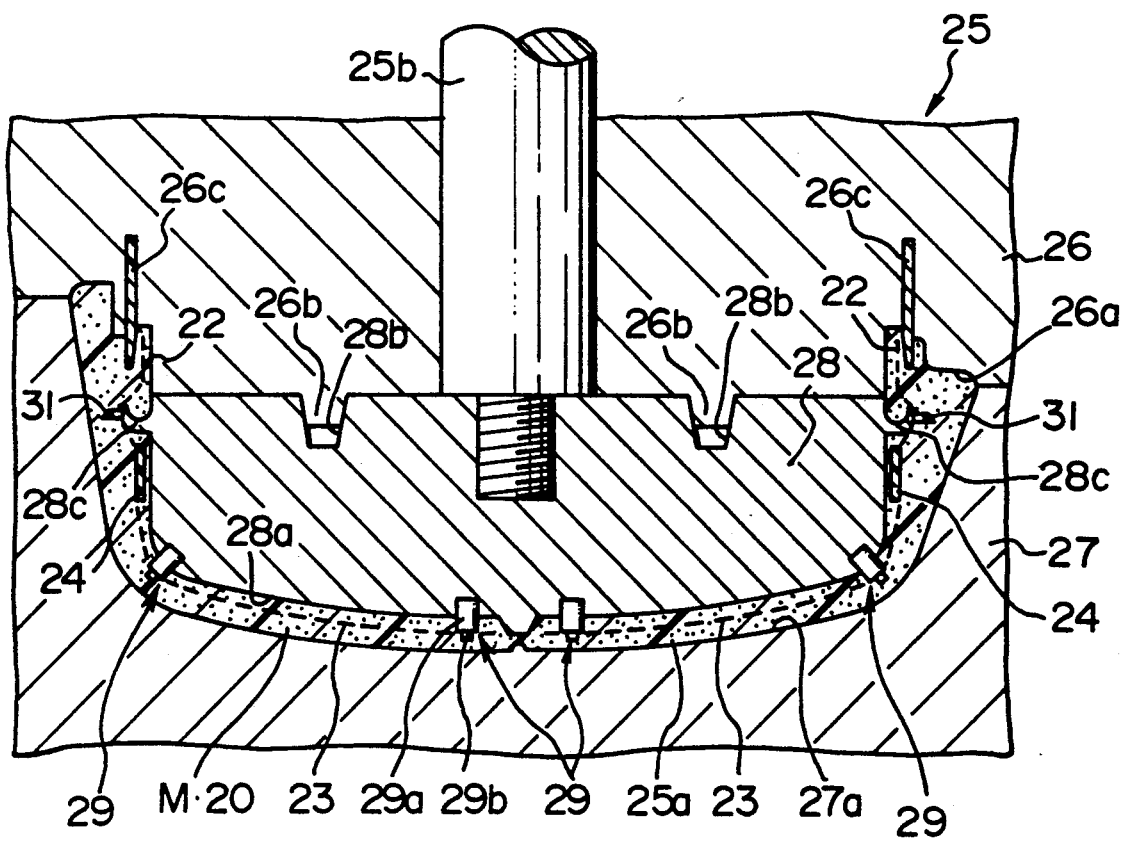
FIG. 4 is a cross-sectional view of an injection mold, showing the manner in which the pad is molded.

As shown in FIG. 4, an injection mold 25 used for this molding comprises a stationary mold member 26, a movable mold member 27 and a core 28 which have predetermined cavity surfaces 26a, 27a and 28a which jointly form a predetermined cavity 25a for molding the pad 11 when the mold 25 is clamped or closed. Since the pad 11 to be molded has the curved upper wall portion 12, the cavity surfaces 27a and 28a of the movable mold member 27 and the core 28 are curved into predetermined configurations, respectively.

The core 28 serves to form the inner surface of the pad 11, and is held by an ejector pin 25b extending through the stationary mold member 26. At the time of the mold opening, the core 28 is projected away from the stationary mold member 26 by the ejector pin 25b, thereby facilitating the release of the molded pad 11 from the mold.

The core 28 has a positioning recess 28b corresponding to positioning projection 26b formed on the stationary mold member 26. The core 28 also has a projection 28c for forming the retaining groove 15a in the pad 11. The stationary mold member 26 also has a projection 26c for forming the retaining groove 15b in the pad 11.

A plurality of set pins 29 and a plurality of support pins 30 are fixedly mounted on predetermined portions of the cavity surface 28a of the core 28, respectively. These pins 29 and 30 serve to hold the upper portions 23 of the net insert 21 in spaced relation to the cavity surfaces 27a and 28a.

Figure 5:
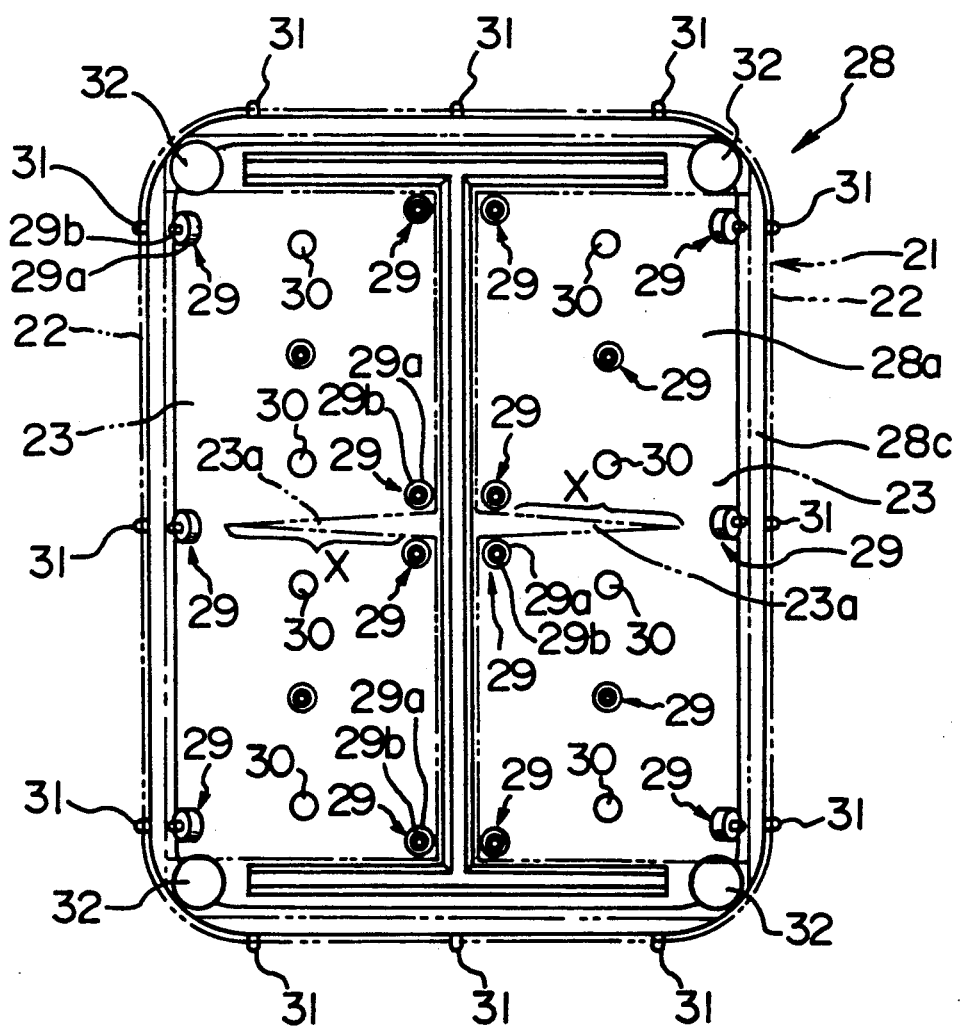
FIG. 5 is a bottom view of a core of the injection mold.

As shown in FIGS. 4 and 5, each set pin 29 is of a generally cylindrical shape, and has a proximal portion (greater-diameter portion) 29a whose diameter is greater than the mesh size of the net insert 21, and a tapered distal end portion (smaller-diameter portion) 29b which is smaller in diameter than the greater-diameter portion 29a and is decreasing in diameter progressively from the greater-diameter portion 29a toward its distal end. The diameter of the distal end of the set pin 29 is smaller than the mesh size of the net insert 21.

Each support pin 30 has a diameter greater than the mesh size of the net insert 21, and has generally the same shape as the greater-diameter portion 29a of the set pin 29.

In core 28, pins 31 are respectively mounted on predetermined portions of the projection 28c, and are adapted to be engaged with the meshes of the tubular base portion 22 of the net insert 21. Four pins 32 are fixedly mounted on the side wall of the core 28 at four corners thereof. Each pin 32 is provided for spacing the base portion 22 from the cavity surface 28a of the core 28 over a wide area.

The set pins 29, the support pins 30 and the pins 32 are so arranged that the net insert 21 can be disposed generally centrally of the thickness dimension of the wall portions 12 and 15.

Figure 6:
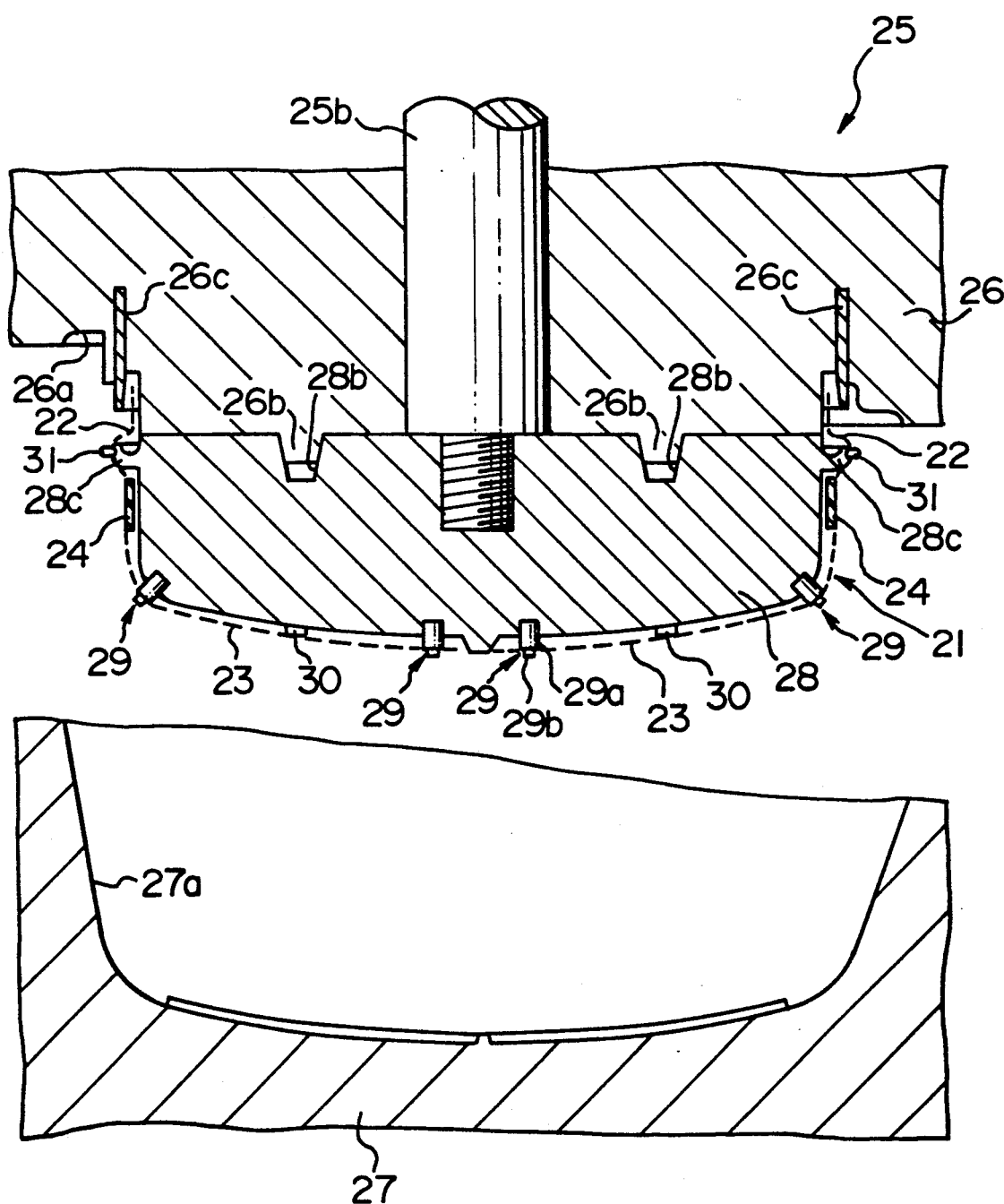
FIG. 6 is a cross-sectional view of the injection mold, showing the net insert being set on the injection mold.

When the net insert 21 is to be set in the injection mold 25 in its opened condition, the ring-like base portion 22 is extended around the outer peripheral surfaces of the four pins 32 of the core 28, and the meshes of the base portion 22 are engaged with the pins 31, as shown in FIG. 6.

Thereafter, the meshes of the upper portions 23 of the net insert 21 are engaged with the smaller-diameter portions 29b of the set pins 29, while pulling the upper portions 23.

At this time, if the slit 23a were not provided as is the case with the prior art, each upper portion 23 of the net insert 21 would become slack over region X (see FIG. 5) extending from one edge thereof remote from the base portion 22 toward the base portion 22, because the cavity surface 28a of the core 28 is curved. In this embodiment, however, since the slit 23a is formed in each upper portion 23, the slit 23a tends to be closed to absorb such slack, and therefore the net insert 21 can be set on the core 28 without producing wrinkles therein.

Thereafter, the mold is closed, and a predetermined molding material M is poured into the cavity 25a to mold the covering layer 20, thereby producing the pad 11 of predetermined shape (see FIG. 4).

Thus, in the pad 11 of this embodiment, the predetermined slits 23a are formed respectively in the upper portions 23 of the net insert 21, and no wrinkles are generated in the net insert 21 when setting the net insert 21 in the injection mold 25 in order to mold the covering layer 20. Therefore, the covering layer 20 can be molded satisfactorily without exposing part of the net insert 21 and without producing a molding sink, a cavity, deformation, etc., in part of the covering layer 20 at the openable portion 13. As a result, each openable portion 13 of the pad 11 can have a good appearance.

Figure 7:
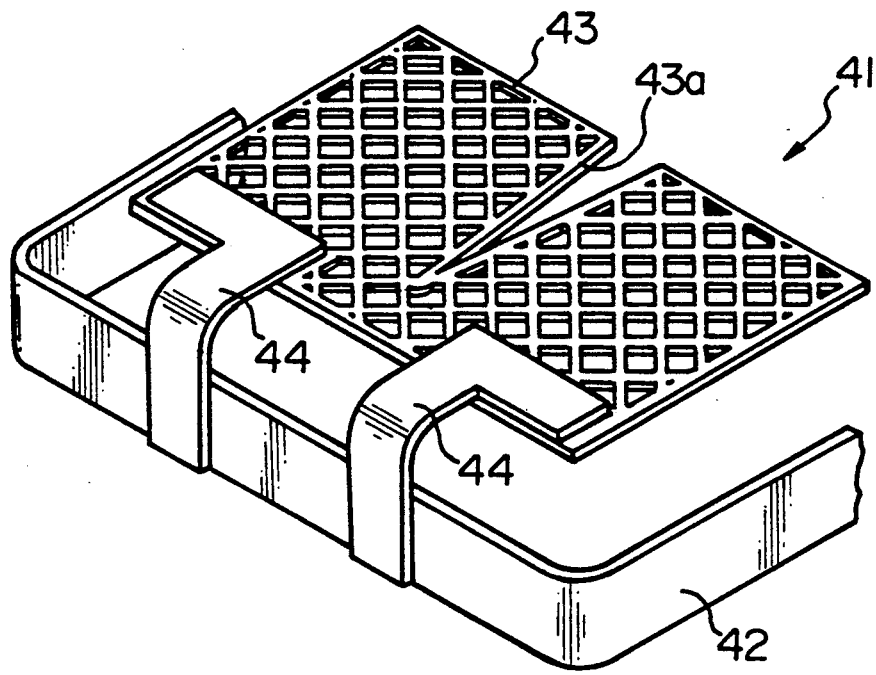
FIG. 7 is a partial perspective view of a portion of modified net insert.

In the pad 11 of this embodiment, although the net insert 21, composed of the base portion 22 and the upper portions 23, is woven entirely of synthetic fibers, any other suitable net insert may be used. For example, in a modified net insert 41 shown in FIG. 7, a base portion 42 is formed by a band woven of synthetic fibers such as polyamide, a band molded of a synthetic resin material, or a metal sheet or plate. Each upper portion 43, which has a slit 43a in accordance with the invention, is formed by a net element molded of a synthetic resin material. The base portion 42 and the upper portion 43 are interconnected by sewing flexible members 44 of aramid fibers or the like. In this case, the upper portion 43 may be formed by a net member woven of synthetic fibers.

Figure 8:
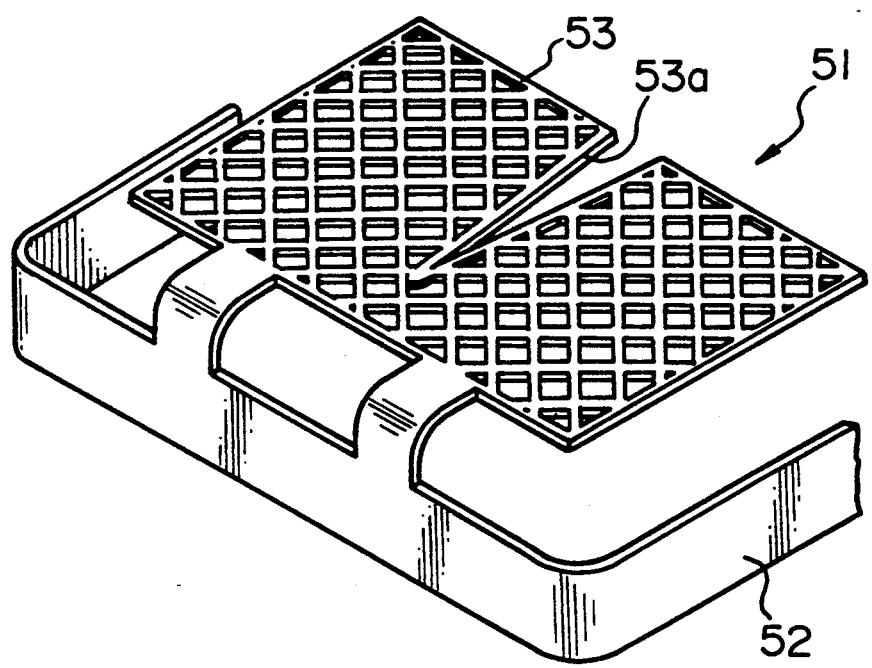
FIG. 8 is a view similar to FIG. 7, showing another modified net insert.
Figure 9:
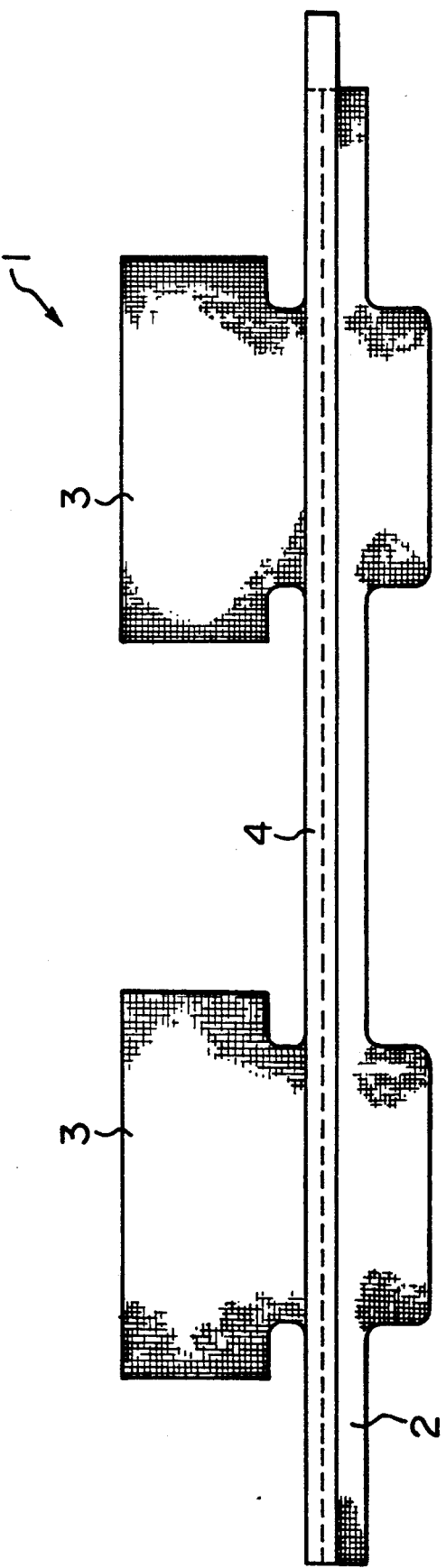
FIG. 9 is a developed view of a net insert used in a conventional pad.
Figure 10:
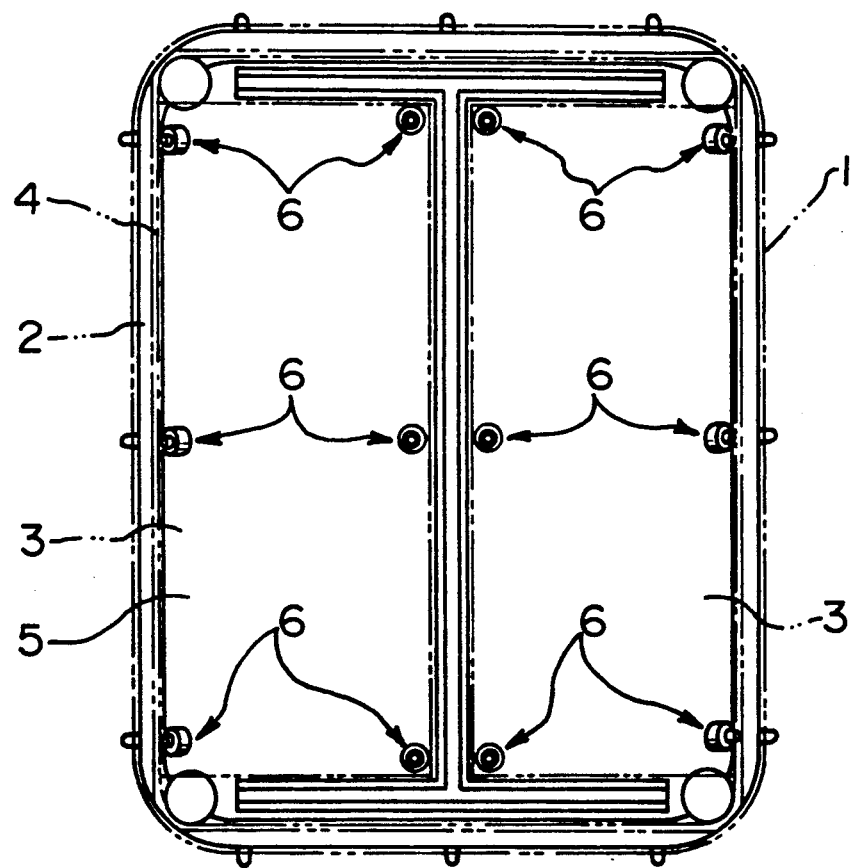
FIG. 10 is a bottom view of a mold for molding the conventional pad.

FIG. 8 shows another modified net insert 51. This net insert 51, composed of a base portion 52 and upper portions 53 each having a slit 53a are molded entirely of a synthetic resin material.

In the above embodiment, although the upper wall portion 12 is curved convexly upwardly so as to be bulged, the upper wall portion 12 may be curved concavely downwardly so as to be recessed. Also, the side wall portion 15 may be bulged or recessed along the pivot axis 0. In such cases, wrinkles are liable to be produced at the upper portions 23 of the net insert 21; however, the appearance of each openable portion can be made satisfactory by applying the concept of the present invention, as in the embodiment specification described above.

Further, in the pad 11 of the foregoing embodiment, the slit 23a is formed in each of the two upper portions 23 of the net insert 21. However, where the wall portions 12 and 15 have shapes such that when the net insert 21 is set on the core 28, wrinkles are hardly produced in the net insert, the slit 23a may be formed in only one of the upper portions 23.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A pad for an air bag device comprising:
   an upper wall portion having an openable portion which, upon expansion of an air bag, is separated from a side wall portion of said pad, leaving a hinge portion, and is angularly movable about said hinge portion so as to be opened;
   said openable portion including a net insert and a covering layer of a soft material covering said net insert;
   said net insert having a free edge remote from said hinge portion; and
   a slit formed in said net insert to extend from said free edge toward said hinge portion substantially perpendicularly with respect to said free edge and along at least about one half of a distance from said free edge to said hinge portion thereby to define first and second net insert portions within said openable portion.

2. A pad according to claim 1, wherein said net insert has a base portion provided in said side wall portion of said pad, and an upper portion provided in said upper wall portion of said pad.

3. A pad according to claim 1, wherein said net insert includes a base portion and an upper portion which has said slit defined therein, said net insert having a flexible member interconnecting said base portion and said upper portion, said net insert being formed by a net member molded of a synthetic resin material.

4. A pad according to claim 1, wherein said net insert includes a base portion and an upper portion which has said slit defined therein, both said portions being molded of a synthetic resin material.

5. A pad according to claim 2, wherein said upper portion is woven of synthetic fibers, and said base portion has a reinforcement cloth sewn thereto, said cloth being woven of a synthetic fiber material similar to that of said upper portion.

* * * * *